(12) United States Patent
Douix

(10) Patent No.: US 12,457,817 B2
(45) Date of Patent: Oct. 28, 2025

(54) BACKSIDE ILLUMINATION IMAGE SENSOR AND MANUFACTURING METHOD

(71) Applicant: STMicroelectronics (Crolles 2) SAS, Crolles (FR)

(72) Inventor: Maurin Douix, Grenoble (FR)

(73) Assignee: STMicroelectronics (Crolles 2) SAS, Crolles (FR)

( * ) Notice: Subject to any disclaimer, the term of this patent is extended or adjusted under 35 U.S.C. 154(b) by 720 days.

(21) Appl. No.: 17/840,437

(22) Filed: Jun. 14, 2022

(65) Prior Publication Data
US 2022/0406829 A1    Dec. 22, 2022

(30) Foreign Application Priority Data

Jun. 18, 2021  (FR) ........................... 2106486

(51) Int. Cl.
*H10F 39/00*   (2025.01)
*H10F 39/12*   (2025.01)
*H10F 39/18*   (2025.01)

(52) U.S. Cl.
CPC ......... *H10F 39/806* (2025.01); *H10F 39/024* (2025.01); *H10F 39/184* (2025.01); *H10F 39/199* (2025.01); *H10F 39/8067* (2025.01)

(58) Field of Classification Search
CPC ............................ H10F 39/806; H10F 39/8067
See application file for complete search history.

(56) References Cited

U.S. PATENT DOCUMENTS

| | | | | |
|---|---|---|---|---|
| 11,538,836 | B2 * | 12/2022 | Zang | H10F 39/184 |
| 2018/0337211 | A1 * | 11/2018 | Su | H10F 39/8063 |
| 2019/0019832 | A1 | 1/2019 | Zhao et al. | |

FOREIGN PATENT DOCUMENTS

| | | |
|---|---|---|
| CN | 1427486 A | 7/2003 |
| CN | 112563296 A | 3/2021 |
| CN | 219350230 U | 7/2023 |
| EP | 3104421 A1 | 12/2016 |
| JP | 2012064824 A | 3/2012 |
| TW | I725765 B | 4/2021 |

OTHER PUBLICATIONS

INPI Search Report and Written Opinion for priority application, FR 2106486, report dated Mar. 4, 2022, 8 pgs.
CN First Office Action and Search Report for counterpart CN Appl. No. 202210691110.1, report dated May 6, 2025, 7 pgs.

* cited by examiner

*Primary Examiner* — Douglas M Menz
(74) *Attorney, Agent, or Firm* — Crowe & Dunlevy LLC

(57) ABSTRACT

An integrated sensor includes a substrate made of a first semiconductor material having a first optical refractive index. The substrate includes a pixel array, wherein each pixel has a photosensitive active zone formed by an index contrast zone including a matrix of the first semiconductor material and a periodic structure embedded in the matrix. The periodic structure extends from the backside of the substrate and has a two-dimensional periodicity in a parallel plane with the backside. A value of the periodicity is linked with the wavelength of the optical signal and with the first refractive index. Elements of the periodic structure are formed of a second optically transparent material having a second refractive index less than the first refractive index. These elements are positioned at locations defined by the periodicity except for at one location defining a region, preferably central, that is devoid of a corresponding one of the elements.

18 Claims, 3 Drawing Sheets

BACKSIDE ILLUMINATION IMAGE SENSOR AND MANUFACTURING METHOD

PRIORITY CLAIM

This application claims the priority benefit of French Application for Patent No. 2106486, filed on Jun. 18, 2021, the content of which is hereby incorporated by reference in its entirety to the maximum extent allowable by law.

BACKGROUND

Implementations and embodiments relate to backside illumination (BSI), and more particularly the enhancement of the quantum efficiency thereof in particular in the infrared range.

An integrated image sensor comprises in a substrate a pixel array associated with control and processing electronics in respect of signals supplied by the pixels.

An image sensor is said to be of the backside illumination type when it is intended to be illuminated by an optical signal through the backside of the substrate.

The quantum efficiency of a pixel is defined by the ratio between the number of electrons generated and the number of photons received when the optical signal is absorbed by the pixel.

The greater the efficiency, the better the sensitivity of the sensor, and the better the signal-to-noise ratio.

There is hence a need to enhance the quantum efficiency of a backside illumination type integrated image sensor.

There is also a need to provide a gain in terms of crosstalk due to the optical coupling between pixels (interference optical signal reflected or diffracted from one pixel to its neighbors) and in terms of modulation transfer function, so as to obtain a superior contrast on the image.

SUMMARY

In an embodiment, each pixel is formed with a photonic periodic structure having a two-dimensional periodicity in a parallel plane with the backside, this photonic structure having, for example at the level of the central region thereof, a defect.

Thus, according to an aspect, a backside illumination type integrated image sensor is proposed.

This sensor is intended to be illuminated by an optical signal, for example (but non-restrictively) a signal in the infrared range having a wavelength of 940 nm.

The sensor comprises a substrate having a backside and containing a first semiconductor material, for example silicon, having a first optical refractive index.

The sensor comprises a pixel array in the substrate.

Each pixel has a photosensitive active zone.

Each photosensitive active zone is an index contrast zone including a matrix formed of the first semiconductor material (for example silicon) and a periodic structure, embedded in said matrix, formed of a second material (for example silicon dioxide) having a lower refractive index than that of the first material.

This periodic structure extends into said matrix from the backside and has a two-dimensional periodicity in a parallel plane with the backside.

This two-dimensional periodicity is not necessarily identical along two orthogonal directions of the plane.

This periodic structure is referred to as photonic crystal as the value of the periodicity is linked with the wavelength of the optical signal and with the first refractive index, the first material guiding the propagation of the optical signal through the photosensitive zone.

Thus, typically, this periodicity value is substantially equal at least to the ratio between the wavelength of the optical signal and the refractive index of the first material. That being said, to further enhance performance, this periodicity value can be taken to be equal to said ratio increased by several tens of percent, for example 30%.

This periodic structure has a plurality of elements, for example rods, formed by the second, optically transparent (i.e., non-absorbent) material, and having a second refractive index less than the first refractive index.

Moreover, this periodic structure has a region, for example a central region, devoid of at least one of these elements.

Thus, due to the presence of this defect in this central region (absence of at least one low refractive index and optically transparent element), the light radiation will be confined in a certain volume of the pixel, for example at the center of the pixel, and the periodic structure will slow down the propagation thereof in the first material (silicon for example).

Therefore, this will result in a greater absorption in this first material and hence a greater number of electrons generated during the pixel integration time, resulting in an enhancement of the quantum efficiency.

The periodic structure has, in the periodicity plane thereof, a honeycomb arrangement of the elements for example.

Moreover, it is particularly advantageous that in the periodicity plane, the crystalline density of all the optically transparent elements occupies at least 50% of the surface area of the photosensitive zone.

This makes it possible to further enhance the quantum efficiency.

As stated above, the elements can be rods, which can have cross-sections of various shapes in the periodicity plane (circle, rectangle, star, etc.).

When the first material is silicon and the wavelength of the optical signal is equal to 940 nm, the pitch between the optically transparent elements in the periodicity plane can be of the order of 400 nm (i.e., equal to 400 nm within +/−30%).

The second, optically transparent, material can be silicon dioxide for example.

Each rod can have a cross-section having a diameter of the other of 200 nm (i.e., 200 nm within +/−25%).

So as to ensure correct collection of the charges generated to the transistors of the processing electronics, it is preferable for the structure to extend in said matrix to a location located at a distance from a front side of the substrate.

Moreover, in order to enhance the absorption efficiency in the first material further, it is advantageous that the sensor further comprise an optical mirror located facing each photosensitive zone, opposite the backside.

When the pixel array has a periodic arrangement having a pitch N, it is advantageous to enhance the operation of the sensor further, that this pitch N be proportional in an integral ratio to a period of the periodic structure (i.e., equal to k times a period of the periodic structure, k being an integer).

According to a further aspect, a method for manufacturing a backside illumination type sensor, intended to be illuminated by an optical signal, comprises the formation, in a substrate having a backside and containing a first semiconductor material having a first optical refractive index, of a pixel array including for each pixel an embodiment of a photosensitive active zone.

According to this aspect of the method, the formation of each photosensitive active zone comprises a formation of a periodic structure embedded in an matrix formed of the first semiconductor material, said periodic structure extending in said matrix from said backside, having a two-dimensional periodicity in a parallel plane with the backside, the value of the periodicity being linked with the wavelength of the optical signal and with the first refractive index, having a plurality of elements formed of a second optically transparent material having a second refractive index less than the first refractive index and having a region, preferably central, devoid of at least one of these elements.

According to an implementation, the formation of the periodic structure comprises a formation of a mask on said backside defining the positions of said elements, an etching of the matrix through said mask and a filling of the orifices resulting from said etching with the second material.

According to an implementation, the etching of the matrix stops at a distance from a front side of the substrate.

According to an implementation, the first material is silicon and the second material is silicon dioxide.

According to an implementation, the method further comprises a formation of an optical mirror facing the photosensitive zones of the pixels, opposite the backside.

BRIEF DESCRIPTION OF THE DRAWINGS

Further advantages and features of the invention will emerge on studying the detailed description of implementations and embodiments, which are in no way restrictive, and of the appended drawings wherein.

DETAILED DESCRIPTION

Figure 1:
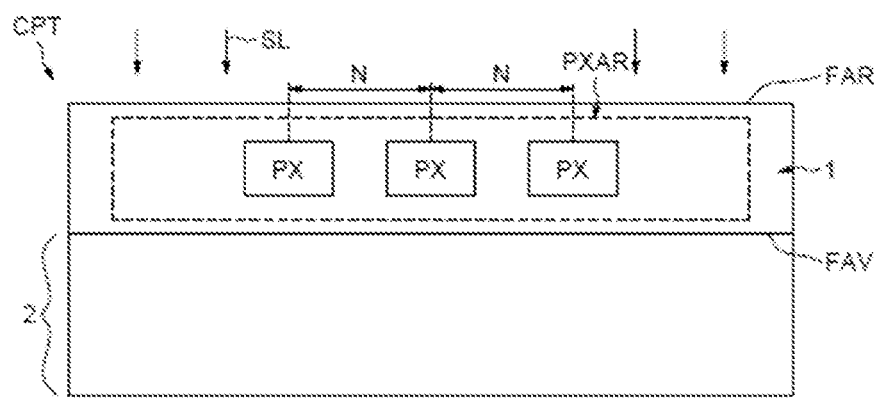
FIG. 1 schematically illustrates an integrated image sensor.

In FIG. 1, the reference CPT denotes an integrated image sensor including, illustrated very schematically, a substrate 1, for example made of silicon, having a backside FAR and a front side FAV.

The backside FAR is intended to be illuminated by an optical signal SL, for example an infrared signal, generally by means of optical devices, such as lenses, optionally colored filters, polarization means, without these examples being restrictive.

The sensor comprises in the substrate 1, a pixel array PXAR.

The pixel array has here a periodic arrangement having a pitch N between the pixels PX.

The image sensor CPT includes on the front side of the substrate 1, an interconnection part 2, commonly referred to by a person skilled in the art using the acronym BEOL (Back End Of Line).

This part 2 typically comprises metallic tracks and vias for providing the interconnection between the different elements of the sensor, particularly the pixels, and the transistors of control and processing electronics in respect of the signals emitted by the pixels, these control electronics not being shown here for simplification purposes.

That being said, these control electronics have a conventional structure known per se.

Figure 2:
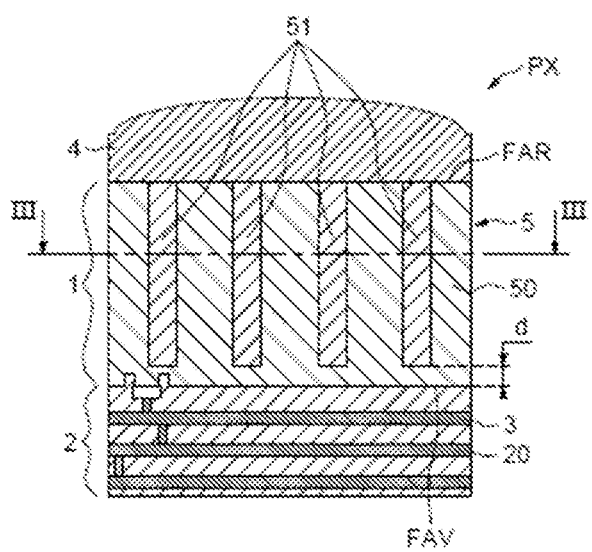
FIG. 2 is a sectional view of a pixel.

FIG. 2 illustrates schematically a sectional view of a pixel PX of the pixel array PXAR.

The pixel PX includes an index contrast photosensitive zone forming a matrix 50 formed of a first semiconductor material, typically the silicon of the substrate.

This index contrast photosensitive zone includes moreover a periodic structure 5 embedded in the matrix 50 and including a plurality of elements 51 formed of a second optically transparent (non-absorbent) material, for example silicon dioxide.

This photosensitive zone is said to be index contrast as the optical refractive index of the first material (silicon) is different from the refractive index of the second material (silicon dioxide).

The refractive index of the first material forming the matrix 50 has a refractive index which is greater than the refractive index of the second optically transparent material.

For example, the refractive index of silicon is close to 3.4 and the refractive index of silicon dioxide is close to 1.46.

As seen schematically in FIG. 2, the elements 51 of the periodic structure 5 extend from the backside FAR of the substrate over a depth less than that of the substrate.

In other words, the elements 51, typically rods, stop at a distance d from the front face FAV of the substrate. This distance d is, for example, of the order of 1 to 2 microns.

On the backside FAR of the photosensitive zone, an optical device 4, for example here a lens, is disposed.

The interconnection part 2 includes, besides the metallic tracks 20, an optical metallic mirror 3 disposed facing the photosensitive zone of the pixel and more specifically facing the front face FAV.

This metallic mirror is advantageously formed by the metal of a metal level of this interconnection part.

Figure 3:
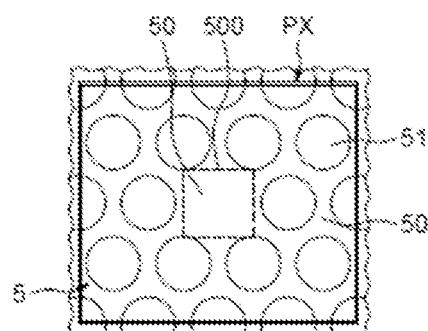
FIG. 3 is a sectional view along the line of FIG. 2.

As illustrated in FIG. 3 which is a sectional view along the line III-III of FIG. 2, the periodic structure 5 has a two-dimensional periodicity in a plane, which is the plane of FIG. 3, and which is a parallel plane with the backside FAR.

The periodic structure has in the periodicity plane thereof a honeycomb arrangement of the elements 51 at locations defined by the periodicity/pitch and matrix and has here a central region 500 having a defect (i.e., a region which is devoid of at least one of the elements 51).

In other words, the central region 500 includes the first material, here silicon.

Figure 4:
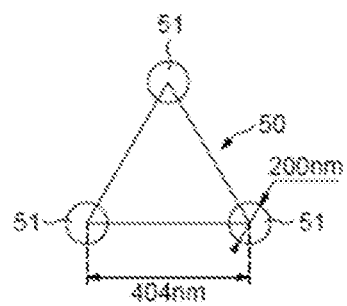
FIG. 4 illustrates schematically a value of periodicity linked with wavelength.

As illustrated schematically in FIG. 4, the value of the periodicity is linked with the wavelength of the optical signal SL and with the first refractive index of the first material (here silicon).

The periodicity in a direction of the plane can optionally differ from that in the other orthogonal direction, as in the case of the honeycomb structure, in order to increase the density of the second material.

More specifically, the pitch between the elements 51 in the periodicity plane is here of the order of 400 nm (side of an equilateral triangle joining the centers of three rods 51), within +/−30%, for a wavelength of the optical signal SL equal to 940 nm corresponding to infrared.

In order to enhance the operation of the sensor further, the spacing pitch N of the pixels PX is advantageously proportional in an integral ratio to the pitch between the elements 51.

Moreover, the diameter of the rods 51 is of the order of 200 nm within +/−25% and the crystalline density of the cross-sections of all the rods occupies at least 50% of the surface area of the photosensitive zone, and for example 50%.

The defect, preferably central, of the periodic structure (i.e., the absence of at least one rod in the preferably central region 500 at a location which otherwise would have rod in accordance with the defined pitch or periodicity) forms a waveguide for the light radiation SL and the periodic structure surrounding this waveguide will slow down the propagation rate of the light signal in the silicon and hence increase the absorption time and hence the quantum efficiency of the pixel.

It is thus possible to obtain a 25% increase in the quantum energy compared to a pixel not having a periodic structure with a defect in the photosensitive zone.

In operation, the light signal illuminates the backside of the sensor, enters the central region 500 of the photosensitive zone after passing through the lens 4 and is propagated in the waveguide mentioned above to be reflected on the metallic mirror 3 and distribute in the waveguide. This return in the waveguide further increases the absorption time in silicon and therefore hence increases the quantum energy of the pixel further. The quality of the reflection to the same pixel due to the presence of the waveguide (and not diffracted to neighboring pixels) also provides a gain in terms of crosstalk and modulation transfer function.

Reference is now made more specifically to FIGS. 5 to 8 to illustrate an implementation of the method for manufacturing such a pixel.

Obviously, all the pixels are embodied simultaneously, but FIGS. 5 to 8 only illustrate the steps for one pixel.

Figure 5:
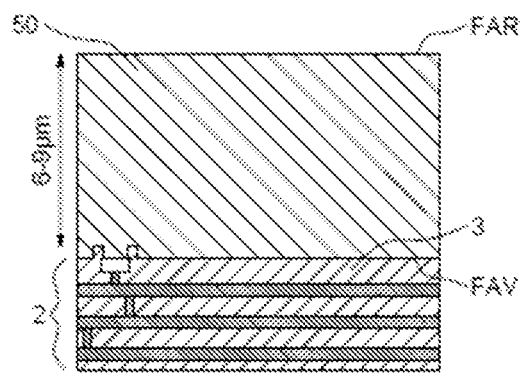
FIGS. 5 to 8 illustrate an implementation of a method for manufacturing a pixel.

In FIG. 5, a substrate is provided including an epitaxial zone 50 (the matrix) of silicon having for example a height of 6 to 9 microns.

The front side of the photosensitive zone (front side of the matrix 50) FAV supports the interconnection part 2 incorporating the metallic mirror 3.

Figure 6:
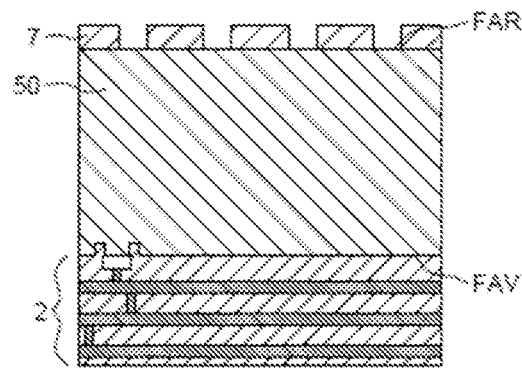

On the backside of the matrix 50, a mask 7, for example a resin mask, is formed, the orifices of which delimit the positions of the future silicon dioxide rods (se, FIG. 6).

Figure 7:
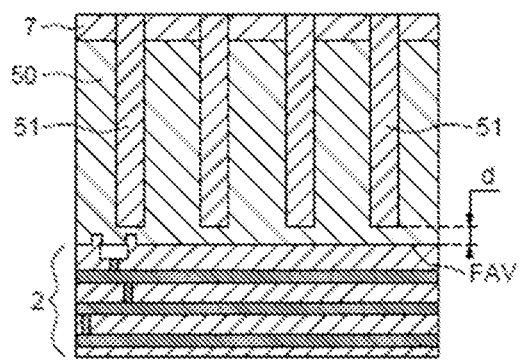

Then, as illustrated in FIG. 7, a conventional etching known per se is performed, through the orifices of the mask 7, of the silicon of the matrix 50 and the orifices thus formed are filled with silicon dioxide so as to form the rods 51.

It will be noted here, as stated above, that it is particularly advantageous that the ends of the rods 51, and that hence the ends of the orifices resulting from the etching, be located at a distance d different to zero (for example of the order of 1 to 2 microns) from the front face of the matrix 50, so as to promote good collection of the electrons generated by the absorption of the light signal in silicon.

Figure 8:
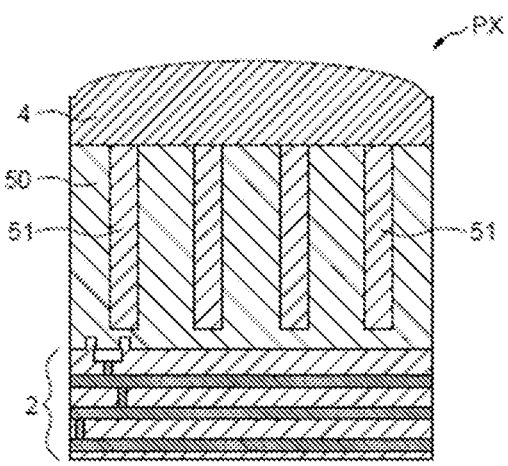

Then, as illustrated schematically in FIG. 8, the mask 7 is removed, the backside is polished and the lens 4 is fastened to the backside of the pixel so as to form the pixel illustrated in FIG. 2.

The invention is not restricted to the implementations and embodiments described but encompasses all variants.

Thus, even though the region of the periodic structure having the defect is preferably the central region, particularly for manufacturing reasons, this region might not be central.

Moreover, further first materials are possible, such as for example germanium or a silicon/germanium alloy. Further second materials are possible, such as for example silicon nitride or a high dielectric constant dielectric, known by a person skilled in the art as "high K".

Furthermore, further wavelengths (optionally in the visible range) of the optical signal SL are possible in exchange for an adjustment of the dimensions of the periodic structure.

The invention claimed is:

1. A backside illumination type integrated image sensor, comprising:
    a substrate having a backside configured to be illuminated by an optical signal and containing a first semiconductor material having a first optical refractive index; and
    a pixel array in the substrate;
    wherein each pixel has a photosensitive active zone;
    wherein each photosensitive active zone is an index contrast zone including a matrix formed of the first semiconductor material and a periodic structure embedded in said matrix, said periodic structure extending in said matrix from said backside;
    wherein the periodic structure has a two-dimensional periodicity in a parallel plane with the backside;
    wherein a value of the two-dimensional periodicity is linked with a wavelength of the optical signal and with the first optical refractive index; and
    said periodic structure is formed by a plurality of elements made of a second optically transparent material having a second refractive index less than the first refractive index positioned at locations in the parallel plane defined by the two-dimensional periodicity; and
    wherein the photosensitive active zone includes a region at one of said locations in said parallel plane defined by the two-dimensional periodicity which is devoid of a corresponding one of the elements;
    wherein the one of said locations that is devoid of the corresponding one of the elements is surrounded in the photosensitive active zone by locations in said parallel plane defined by the two-dimensional periodicity which include elements.

2. The sensor according to claim 1, wherein said region is a central region.

3. The sensor according to claim 1, wherein the periodic structure has a honeycomb arrangement of the elements in the plane of the two-dimensional periodicity.

4. The sensor according to claim 1, wherein, in the plane of the two-dimensional periodicity, a crystalline density of all elements occupies at least 50% of a surface area of the photosensitive zone.

5. The sensor according to claim 1, wherein the elements are rods.

6. The sensor according to claim 1, wherein the first material is silicon.

7. The sensor according to claim 5, wherein the wavelength of the optical signal is equal to 940 nm, and the pitch between the elements in the plane of the two-dimensional periodicity is of the order of 400 nm.

8. The sensor according to claim 7, wherein the second material is silicon dioxide.

9. The sensor according to claim 8, wherein each rod has a cross-section having a diameter of the order of 200 nm.

10. The sensor according to claim 1, wherein the structure extends in said matrix to a location located at a distance from a front side of the substrate.

11. The sensor according to claim 1, further comprising an optical mirror located facing each photosensitive zone opposite the backside.

12. The sensor according to claim 1, wherein the pixel array has a periodic arrangement having a pitch proportional in an integral ratio to a period of the periodic structure.

13. A method for manufacturing a backside illumination type integrated image sensor, comprising, in a substrate having a backside intended to be illuminated by an optical signal and containing a first semiconductor material having a first optical refractive index:

forming a pixel array including a photosensitive active zone for each pixel;

forming a periodic structure in each photosensitive active zone that is embedded in a matrix formed of the first semiconductor material;

wherein said periodic structure extends in said matrix from said backside and has a two-dimensional periodicity in a parallel plane with the backside;

wherein a value of the two-dimensional periodicity is linked with a wavelength of the optical signal and with the first refractive index;

wherein forming the periodic structure comprises:

producing a plurality of elements formed of a second optically transparent material having a second refractive index less than the first refractive index positioned at locations in the parallel plane defined by the two-dimensional periodicity; and defining a region at one of said locations in said parallel plane defined by the two-dimensional periodicity which is devoid of a corresponding one of the elements, wherein the one of said locations that is devoid of the corresponding one of the elements is surrounded in the photosensitive active zone by locations in said parallel plane defined by the two-dimensional periodicity which include elements.

14. The method according to claim 13, wherein said region is a central region.

15. The method according to claim 13, wherein forming the periodic structure comprises:

forming a mask on said backside defining locations for said elements;

etching of the matrix through said mask; and filling of orifices resulting from said etching with the second material.

16. The method according to claim 15, wherein the etching of the matrix stops at a distance from a front side of the substrate.

17. The method according to claim 13, wherein the first material is silicon and the second material is silicon dioxide.

18. The method according to claim 13, further comprising providing an optical mirror facing the photosensitive zones of the pixels, opposite the backside.

* * * * *